United States Patent
Rossi

(10) Patent No.: US 7,723,966 B2
(45) Date of Patent: May 25, 2010

(54) SWITCHING VOLTAGE REGULATOR CONTROL DEVICE

(75) Inventor: Sandro Rossi, Pavia (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 473 days.

(21) Appl. No.: 11/690,680

(22) Filed: Mar. 23, 2007

(65) Prior Publication Data
US 2007/0236977 A1    Oct. 11, 2007

(30) Foreign Application Priority Data
Mar. 24, 2006    (EP) ................... 06425201

(51) Int. Cl.
*G05F 1/10*    (2006.01)
*G05F 1/70*    (2006.01)
*G05F 1/575*    (2006.01)
*G05F 1/613*    (2006.01)

(52) U.S. Cl. ............... 323/259; 323/284; 323/285; 323/288

(58) Field of Classification Search ............ 323/282, 323/284, 252, 315, 259, 285, 288, 344
See application file for complete search history.

(56) References Cited

U.S. PATENT DOCUMENTS 5,402,060 A * 3/1995 Erisman .................. 323/268
5,982,156 A * 11/1999 Weimer et al. ............. 323/222
6,989,660 B2 * 1/2006 Mauthe .................... 323/274
2003/0052654 A1   3/2003 Kanakubo et al.
2005/0007089 A1   1/2005 Niiyama et al.

FOREIGN PATENT DOCUMENTS

EP    1361651 A2    11/2003

* cited by examiner

*Primary Examiner*—Gary L Laxton
*Assistant Examiner*—Nusrat J Quddus
(74) *Attorney, Agent, or Firm*—Lisa K. Jorgenson; E. Russell Tarleton; Seed IP Law Group PLLC

(57) ABSTRACT

A switching voltage regulator control device, includes first and second half-bridges each comprising a switch. The first half-bridge is located between an input voltage and a reference voltage and the second half-bridge is located between an output voltage and the reference voltage. The regulator comprises a detector for detecting the error between a reference voltage representative of the output voltage and another reference voltage and an integrator for integrating said error. The control device is suitable for providing a first duty cycle for driving the switch of the first half-bridge that is proportional to the integrated error divided by the input voltage and a second duty cycle for driving the switch of the second half-bridge that is proportional to the value of the input voltage divided by the integrated error.

27 Claims, 3 Drawing Sheets

SWITCHING VOLTAGE REGULATOR CONTROL DEVICE

BACKGROUND OF THE INVENTION

1. Field of the Invention

The present invention refers to a control device for a switching voltage regulator.

2. Description of the Related Art

Switching voltage regulators are known in the prior art. A switching voltage regulator of the buck/boost type is shown in FIG. 1. The regulator of FIG. 1 works by voltage switching and comprises a first half-bridge 1, consisting of a high side switch 11 and a low side switch 12 driven by a driving device 13, located between an input voltage Vi and electrical ground GND, and a second half-bridge 2, consisting of a high side switch 21 and a low side switch 22 driven by a driving device 23, located between an output voltage and electrical ground GND. The output voltage Vo is applied across an electrical load LOAD. The regulator comprises an error integration block comprising an error operational amplifier 31 suitable for detecting the error between a voltage proportional to the output voltage Vo, expressed as K*Vo, and a reference voltage Vref; the output of the error operational amplifier 31 is connected to a compensation network consisting of a series of resistances R and a capacitor C that makes it possible to integrate in time the error provided by the amplifier 31. The integrated error e1 is sent in input to a pulse-width modulated (PWM) generator 40 which also has in input the signal produced by a triangular wave generator 41; the PWM generator 40 is suitable for generating two signals which are sent to the driving circuits 13, 23 to drive appropriately the half-bridges 1 and 2. An inductance L is located between the half-bridges 1 and 2.

The triangular wave generator 41 determines the frequency at which the system works. If we indicate with duty cycle D the percentage of period in which the high side of a half-bridge is on, the regulated output voltage Vo is related to the input voltage by the relation Vo/Vi=Di/Do where Di is the duty cycle of the half-bridge 1 and Do is the duty cycle of the half-bridge 2.

The average current in the inductance Il is given by Il=Iload/Do where Iload is the current on the load and the duty cycles Do and Di are obtained by comparing the integrated error e1 with the triangular wave coming from the generator 41; the latter component provides a triangular wave proportional to the input voltage Vi.

A simple way to drive the half-bridges 1 and 2 is to make Do=1−Di, in other words to drive the half-bridge 2 with a signal complementary to the half-bridge 1. This gives the following relations:

$$\frac{Vo}{Vi} = \frac{Di}{1-Di};$$

$$Il = \frac{Iload}{1-Di} = Iload\left(1 + \frac{Vo}{Vi}\right).$$

In this case there is considerable loss on the series resistance of the inductance L which is proportional to the average current flowing through it. Maximizing the duty cycle of the half-bridge 2 would allow one to reduce this current. The optimum solution is obtained by letting Do=1 during the buck state and letting Di=1 during the boost state. This situation also makes it possible to halve the switching losses of the switches of the half-bridges 1 and 2.

While running during the buck state we have Vo=Di*Vi; if we let Vh be the amplitude of the triangular wave we have Di=e1/Vh where e1 is the integrated error in input to the PWM block 40. If the amplitude Vh is a function of the input voltage Vi, we have Vh=Vi/K and Vo=K*e1. During the boost state we have Vo=Vi/Do=Vh*Vi/e1=Vi$^2$/(K*e1), therefore the output voltage Vo varies instantaneously with every variation of the square of the input voltage Vi.

The PWM block 40 transforms the integrated error e1 into a pair of duty cycles Di, Do to drive the half-bridges 1 and 2. The duty cycle Di is generally produced by comparing the integrated error e1 directly with a saw-tooth wave. The duty cycle Do instead is constructed by comparing a signal e2, which is a function of the integrated error e1, with the triangular wave produced by the generator 41. The function from which this signal is generated depends on the type of driving chosen. In the case of the optimum efficiency condition it is very important that when the signal e1 exceeds the amplitude of the triangular wave, the signal e2 starts to cross it. There should be only one point at which the duty cycles D1, Do are at 100%; if this does not happen a case may arise in which for a certain range of the ratio Vo/Vi the half-bridges 1 and 2 either switch simultaneously, reducing the efficiency of the regulator, or neither one of the half-bridges switches and this could cause undesired oscillations in the output voltage Vo.

FIG. 2 shows a typical block diagram of a buck-boost regulator operating in voltage mode. The error given by the difference between the feedback voltage Vfb given by K*Vo and the reference voltage Vref is sent in input to a compensation block characterized by the transfer function Fcomp. The output signal e1, which is the integrated error, is sent to a block having a transfer function Fe and capable of producing the duty cycles Di and Do. Said duty cycles are in input to the block of the converter having the transfer function $$\frac{Vi}{1 + s^2 LC/Do}$$

and which serves to produce the voltage Vo. To make the system linear while running we let Vo/Vi=Vi/(K*e1) and thus obtain $$Fe = \frac{k \cdot Vo^2}{Vi^3}.$$

In the buck state the transfer function Fe=K/Vi; thus the voltages Vi and Vo do not enter any block of the diagram and therefore the gain of the loop is independent of the input and output values.

In the boost state the function Fe is no longer linear and can be expressed as follows:

$$Fe = \frac{Vi}{k \cdot e1^2}.$$

Therefore the gain of the loop varies with the square of the ratio Vo/Vi and is greater than the gain in the buck state. The double pole of the filter LC is shifted to lower frequencies. The increase in the gain and the shift to the lower frequencies of the double pole are factors that contribute to worsening the stability of the system. This translates in practical terms as having to create compensation networks that take these variations into account. In particular in a compensation system with a dominant pole it is necessary to ensure the stability in the worst conditions or have a high output voltage and low input voltage which however makes the system over-compensated in the other conditions and therefore slower.

BRIEF SUMMARY OF THE INVENTION

One embodiment of the present invention provides a control device for a switching regulator that can overcome the disadvantages explained above.

One embodiment of the present invention is a switching regulator control device, said regulator comprising at least a first and second half-bridge connected to each other and each comprising at least one switch, said first half-bridge being located between an input voltage to the regulator and a reference voltage and said second half-bridge being located between an output voltage from the regulator and said reference voltage, said regulator comprising detecting means suitable for detecting the error between a voltage representative of the output voltage and another reference voltage and integration means suitable for integrating said error, the purpose of said control device being to provide a first and second duty cycle to drive the switches belonging to said first and said second half-bridges, said control device having said regulator input voltage in input, wherein said control device is suitable for providing a first duty cycle proportional to the value of the integrated error divided by the value of the regulator input voltage and a second duty cycle proportional to the value of the regulator input voltage divided by the value of the integrated error.

BRIEF DESCRIPTION OF THE SEVERAL VIEWS OF THE DRAWINGS

The characteristics and advantages of the present invention will appear evident from the following detailed description of an embodiment thereof illustrated as non-limiting example in the enclosed drawings, in which.

DETAILED DESCRIPTION OF THE INVENTION

Figure 1:
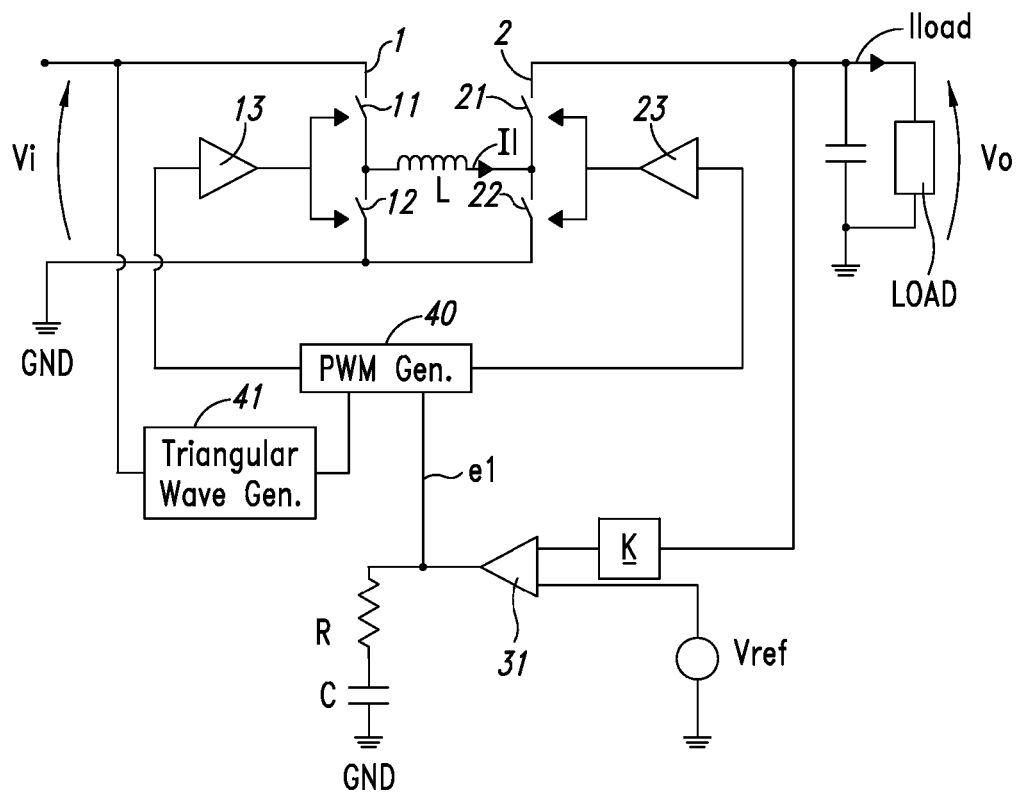
FIG. 1 is a diagram of a buck/boost regulator according to known art.
Figure 3:
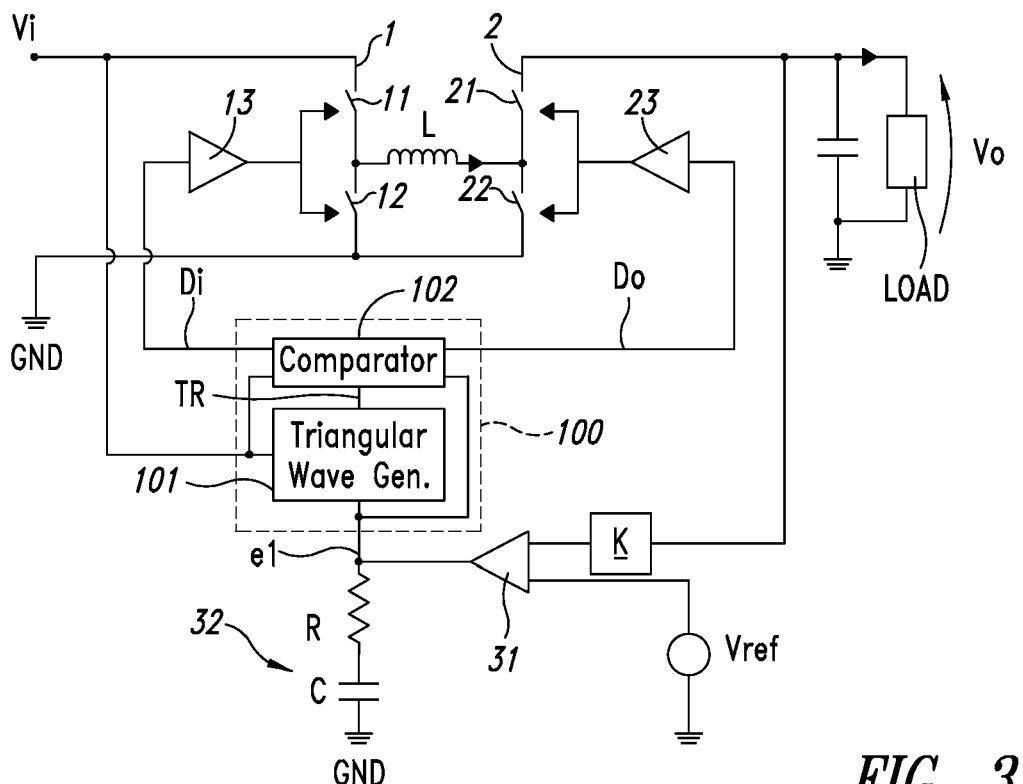
FIG. 3 is a diagram of a buck-boost regulator according to the present invention.

FIG. 3 shows a buck-boost regulator with a control device 100 according to one embodiment of the present invention; the parts in common with the regulator in FIG. 1 will be indicated with the same numerical references. Said regulator comprises at least a first 1 and a second half-bridge 2 each comprising at least one switch; in more detail each half-bridge has a pair of switches, half-bridge 1 has a "low side" transistor 12 and a "high side" transistor 11 and the second half-bridge has a "low side" transistor 22 and a "high side" transistor 21. The first half-bridge is located between an input voltage Vi to the regulator and the ground GND and the second half-bridge is located between an output voltage Vo from the regulator and the ground GND. The regulator comprises an error amplifier 31 suitable for detecting the error between a voltage K*Vo representative of the output voltage and a reference voltage Vref and an integrator 32, including a resistance R and a capacitance C, suitable for integrating said error. The control device 100 has inputs that respectively receive the voltage Vi and the integrated error e1 and is suitable for driving the switches 11, 12, 21, 22 belonging to the two half-bridges 1 and 2. The control device 100 is suitable for determining a duty cycle Di for driving the first half-bridge 1 which is proportional to the value of the integrated error e1 divided by the value of the input voltage Vi and is suitable for determining another duty cycle Do for driving the second half-bridge 2 which is proportional to the value of the input voltage Vi divided by the value of the integrated error e1. The regulator comprises an inductance L located between the two half-bridges 1 and 2; more precisely the inductance L has a terminal connected to the terminal in common with the transistors 11 and 12 and the other terminal connected to the terminal in common with the transistors 21 and 22. The output voltage Vo is applied to a load LOAD.

Figure 4:
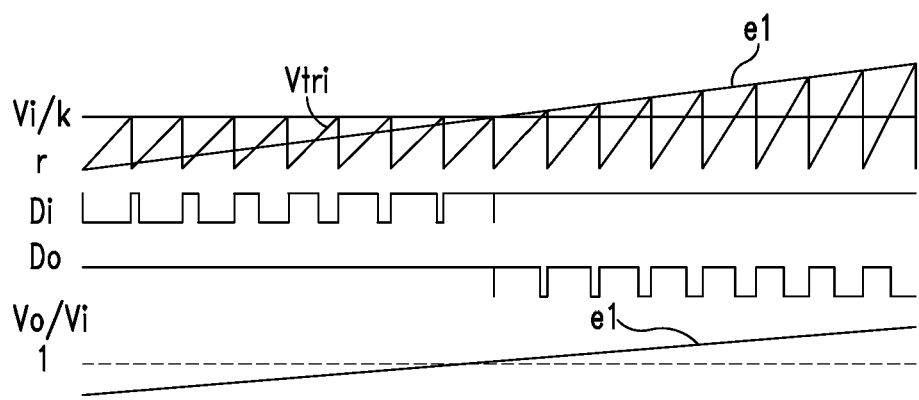
FIG. 4 shows diagrams of the signals in the regulator of FIG. 3.

The control device 100 comprises a triangular wave generator 101 suitable for producing a triangular wave TR of variable amplitude as a function of the integrated error e1, as shown in FIG. 4. If the value of the integrated error e1 is lower than the value Vi/K, denominated as the partition of the input voltage, the amplitude of the triangular wave is Vi/K. If instead the integrated error e1 is higher than the value Vi/K, the amplitude of the triangular wave is equal to the value of the integrated error e1. In brief we have:

if $e1 < Vi/K$ then $Vh = Vi/K$ if $e1 > Vi/K$ then $Vh = e1$.

The control device 100 comprises comparison circuitry 102 suitable for providing the duty cycles Di and Do. The duty cycle Di of the half-bridge 1 is normally obtained by comparing the integrated error e1 with the triangular wave TR while the duty cycle Do of the half-bridge 2 is obtained by comparing Vi/K with the triangular wave TR; we have:

$$Di = \frac{k \cdot e1}{Vi};$$

$$Do = \frac{Vi}{k \cdot e1}.$$

In the buck state things remain substantially identical to the system described previously. Do will still be at 100% because Vi/K is greater than the triangular wave for reasons of construction while Di will increase as the integrated error increases. In the boost state Di will be constantly at 100% because the integrated error is greater than the triangular wave for reasons of construction. Do instead will decrease as the integrated error increases.

In a system of this type there is linear proportionality between the value of the integrated error and the regulated output voltage since $Vo = k \cdot e1$.

Applying this driving implementation of the half-bridges 1 and 2 the problems arising from possible errors introduced by the PWM block of the regulator in FIG. 1 are avoided.

In this way in running condition the error will assume a value around that of Vo/k both in the buck and boost states. A variation in the voltage Vi does not affect the integrated error e1 and consequently the output. This system therefore uses a feed forward on the feed in every buck or boost condition.

Figure 2:
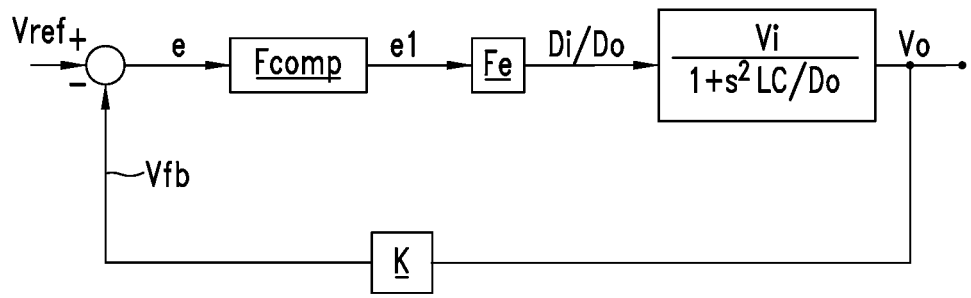
FIG. 2 is a general block diagram of a buck-boost regulator.

Substituting Fe=K/Vi we have, in the block diagram of FIG. 2, the continuous gain of the loop is independent of the values of Vo and Vi and also remains the same whether in the buck or boost state. The pole of the filter LC instead is fixed in the buck state while it has linear dependence on Do in boost. In the running condition in the boost state the value of the output duty cycle will be about Vi/Vo<1, so we can affirm that the pole will shift to lower frequencies. The compensation network must take into account therefore only this effect and not the variation in gain. This makes it possible to create systems with greater bandwidth and therefore which are therefore faster. It also makes it possible to use smaller discrete external components for the compensation.

In some applications it is necessary to limit the duty cycle of the output half-bridge because if this should reach 0% for some reason (high side still off) the control loop could open consequently losing control of the output voltage. A collateral advantage of this application is that the limitation of the duty cycle takes place automatically. In fact to have Do=0% it would be necessary to have Vi zero or the error e1 infinite which are impossible conditions.

Figure 5:
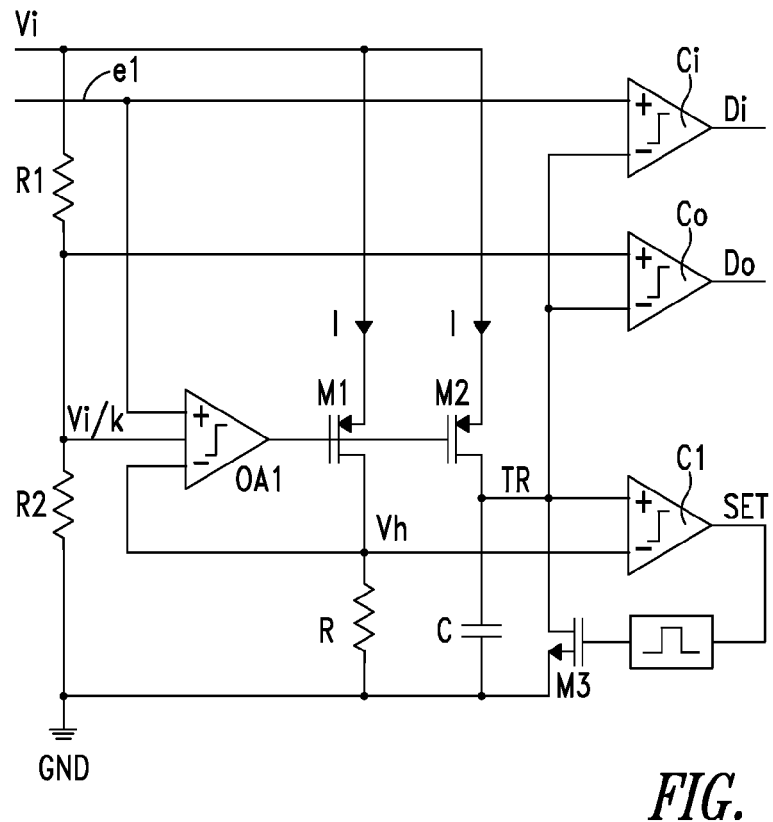
FIG. 5 shows a circuit implementation of the control device of the regulator in FIG. 3.

The control device 100 can be implemented as shown in FIG. 5. The device 100 comprises a buffer OA1 with differential input stage with an inverting input terminal in which the integrated error e1 and the voltage Vi/K are present, created by a partition of the voltage Vi by means of the resistances R1 and R2 located between the voltage Vi and ground GND. The output of the buffer OA1 drives the gates of two PMOS transistors M1 and M2 with the first connected between the input voltage Vi and a resistance R connected to the ground GND and the second connected between the input voltage Vi and a capacitor C connected to the ground GND. The value of the voltage Vh, which is the voltage across the resistance R, determines the amplitude of the triangular wave TR. The voltage Vh is present on the non-inverting terminal of the buffer OA1 which works so that only the higher value between the voltage e1 and the voltage Vi/K is passed to the output. The current I=Vh/R charges the capacitance C by means of the mirror consisting of transistors M1 and M2. The voltage TR across the capacitor C is present at the non-inverting input terminal of the comparator C1 having the voltage Vh at the inverting input terminal. When the voltage TR rises to a value Vh the comparator C1 sends an impulse to an NMOS transistor M3 having its source terminal connected to ground GND and the drain terminal connected to the voltage TR and the inverting terminals of the two comparators Ci and Co; in this way the transistor M3 allows a short circuit of the capacitor C. The triangular wave that is obtained will always have an amplitude Vh equal to the greater of the values Vi/K and e1 and will have a period T=Vh*C/I=RC.

The comparators Ci and Co have non-inverting input terminals connected respectively to the error e1 and the voltage Vi/K and provide the duty cycles Di and Do comparing the triangular wave TR with the error e1 through Ci and with Vi/K through Co.

Figure 6:
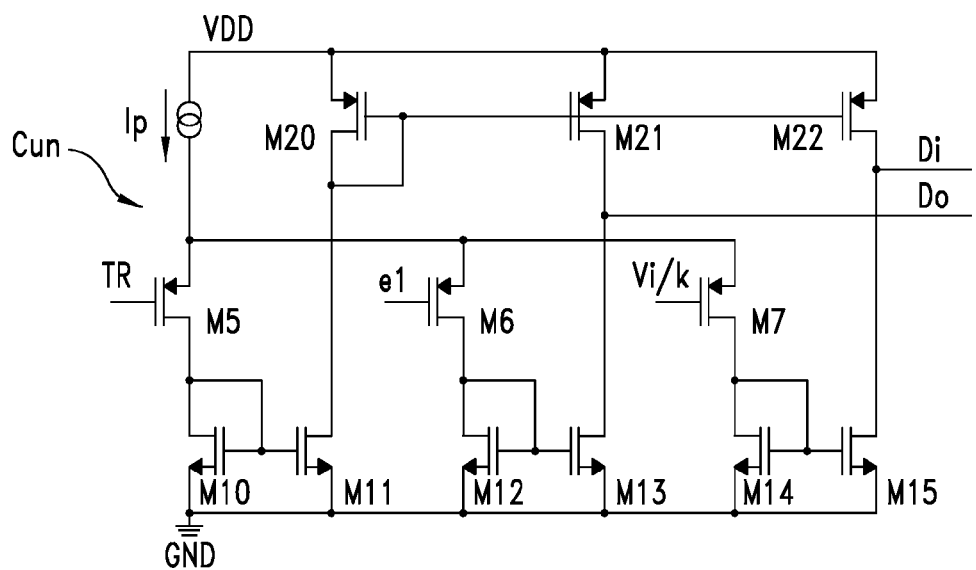
FIG. 6 shows a circuit implementation of a part of the control device in FIG. 5.

To reduce further the mismatches between the two comparators Co and Ci it is possible to use a single circuit comparator Cun comprising pairs of NMOS and PMOS transistors, as shown in FIG. 6. The comparator Cun comprises three NMOS current mirrors M10-M11, M12-M13, M14-M15 having source terminals connected to ground GND, connected to each other by a PMOS current mirror M20-M22 and polarized by a current coming from a generator producing a current Ip connected to a feed voltage VDD. The source terminals of the transistors M20-M22 are connected to the feed voltage VDD while their drain terminals are connected to the drain terminals of the transistors M11, M13 and M15. The drain terminals of the transistors M10, M12 and M14 are connected to the drain terminals of PMOS transistors M5-M7 driven by the voltages TR, e1 and Vi/K and having source terminals connected to the generator of the current Ip. The signals Di and Do are the voltage signals present at the drain terminals of the transistors M13 and M15.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A control device for a switching voltage regulator that includes a first and a second half-bridge connected to each other and each comprising a switch, the first half-bridge coupled between an input voltage to the regulator and a first reference voltage and the second half-bridge coupled between an output voltage from the regulator and the reference voltage, the regulator including a detector structured to detect an error between a voltage representative of the output voltage and a second reference voltage and an integrator structured to produce an integrated error by integrating an error detected by the detector, the control device comprising:

a first driving circuit that drives the switch of the first half-bridge according to a first duty cycle proportional to the integrated error divided by the input voltage;

a second driving circuit that drives the switch of the second half-bridge according to a second duty cycle proportional to the input voltage divided by the integrated error; and a triangular wave circuit that generates a triangular wave having a variable amplitude equal to a first value, given by the input voltage divided by a proportionality constant, when the integrated error is lower than the first value, and equal to a second value given by the integrated error when the integrated error is higher than the first value.

2. The control device of claim 1, wherein the first driving circuit includes a first comparator that compares the integrated error with the triangular wave, and the second driving circuit includes a second comparator that compares the first value with the triangular wave.

3. The control device of claim 1, wherein the triangular wave circuit comprises:

a buffer with a differential input stage having an inverting input terminal to which the first value and the integrated error are applied, a non-inverting input terminal to which a third value is applied, and an output, the buffer structured to transmit through its output the higher of the first value and the integrated error;

a capacitor through which a current passes proportional to the third value;

a third comparator to compare a voltage across the capacitor with the third value; and a circuit driven by the third comparator, to short circuit the capacitor.

4. A control device according to claim 1, wherein said regulator is a buck-boost regulator.

5. A control device according to claim 1, wherein each of said half-bridges comprises a pair of switches.

6. A control device according to claim 1, wherein said half-bridges are connected to each other through an inductance.

7. The control device according to claim 1, wherein the first driving circuit includes a first circuit portion and the second driving circuit includes a second circuit portion, the first and second circuit portions connected to one another and comprise part of a comparator that includes pairs of PMOS and NMOS transistors.

8. A switching regulator, comprising:
first and second half-bridges connected to each other and each comprising a switch, the first half-bridge coupled between an input voltage and a reference voltage, and the second half-bridge coupled between an output voltage and the reference voltage;
a detector structured to detect an error between a voltage representative of the output voltage and a second reference voltage;
an integrator structured to produce an integrated error by integrating the error detected by the detector; and
a control device that includes:
a first driving circuit that drives the switch of the first half-bridge according to a first duty cycle proportional to the integrated error divided by the input voltage;
a second driving circuit that drives the switch of the second half-bridge according to a second duty cycle proportional to the input voltage divided by the integrated error; and
a triangular wave circuit that generates a triangular wave having a variable amplitude equal to a first value, given by the input voltage divided by a proportionality constant, when the integrated error is lower than said first value, and equal to a second value given by the integrated error when the integrated error is higher than the first value.

9. The switching regulator of claim 8, wherein the first driving circuit includes a comparator that compares the integrated error with the triangular wave and the second driving circuit includes a comparator that compares the first value with the triangular wave.

10. The switching regulator of claim 9, wherein the triangular wave circuit includes:
a buffer with a differential input stage having an inverting input terminal to which the first value and the integrated error are applied, a non-inverting input terminal to which a third value is applied, and an output, the buffer structured to transmit through its output the higher of the first value and the integrated error;
a capacitor through which passes a current proportional to the third value;
a comparator that compares a voltage across the capacitor with the third value; and
a circuit driven by the comparator for short-circuiting the capacitor.

11. A switching regulator according to claim 8, wherein said regulator is a buck-boost regulator.

12. A switching regulator according to claim 8, wherein each of said half-bridges comprises a pair of switches.

13. A switching regulator according to claim 8, further comprising an inductance that connects said half-bridges to each other.

14. The switching regulator of claim 8, wherein the first driving circuit includes a first circuit portion, and the second driving circuit includes a second circuit portion, the first and second circuit portions connected to one another and forming part of a comparator that comprises pairs of PMOS and NMOS transistors.

15. A method, comprising:
driving a switch of a first half bridge of a switching regulator according to a first duty cycle, the first half-bridge connected to an input voltage;
driving a switch of a second half-bridge of the switching regulator according to a second duty cycle, the second half-bridge connected to the first half-bridge and to an output voltage; and
producing an integrated error that reflects an error between a voltage representative of the output voltage and a reference voltage, wherein:
the first duty cycle is proportional to the integrated error divided by the input voltage; and
the second duty cycle is proportional to the input voltage divided by the integrated error;
the method further comprising generating a triangular wave having a variable amplitude equal to a first value, given by the input voltage divided by a proportionality constant, when the integrated error is lower than the first value, and equal to a second value given by the integrated error when the integrated error is higher than the first value, wherein:
driving the switch of the first half-bridge includes applying to the switch of the first half-bridge a first driving signal based on the triangular wave; and
driving the switch of the second half-bridge includes applying to the switch of the second half-bridge a second driving signal based on the triangular wave.

16. The method of claim 15, wherein the first driving signal is produced by comparing the integrated error with the triangular wave and the second driving signal is produced by comparing the first value with the triangular wave.

17. The method of claim 16, wherein comparing the integrated error with the triangular wave is performed by a first comparator and comparing the first value with the triangular wave is performed by a second comparator.

18. The method of claim 16, wherein comparing the integrated error with the triangular wave is performed using a first current mirror that includes a first mirror leg driven by the triangular wave and a second mirror leg connected to the first mirror leg and driven by the integrated error; and comparing the first value with the triangular wave is performed using a second current mirror that includes the first mirror leg and a third mirror leg connected to the first and second mirror legs and driven by the first value.

19. A switching regulator, comprising:
first and second half-bridges connected to each other and each comprising a switch, said first half-bridge being located between an input voltage and a reference voltage and said second half-bridge being located between an output voltage and said reference voltage;
a detector structured to detect an error between a voltage representative of the output voltage and another reference voltage;
an integrator structured to produce an integrated error by integrating said error detected by the detector; and
a controller that controls the first and second half-bridges, the controller including:
a first comparator structured to compare the integrated error with a triangular signal based on the input voltage and output a first driving signal for driving the switch of the first half-bridge according to a first duty cycle proportional to the integrated error divided by the input voltage;
a second comparator structured to compare a first value, proportional to the input voltage, with the triangular signal and output a second driving signal for driving the switch of the second half-bridge according to a second duty cycle proportional to the input voltage divided by the integrated error; and a triangular signal generator structured to generate the triangular signal, which has a variable amplitude equal to the first value, given by the input voltage divided by a proportionality constant, when the integrated error is lower than said first value and equal to a second value given by the integrated error when the integrated error is higher than said first value.

20. The switching regulator of claim 19, wherein said the triangular signal generator includes:
a buffer with a differential input stage having an inverting input terminal to which said first value and said integrated error are applied, a non-inverting input terminal to which a third value is applied, and an output, the buffer being suitable for transmitting through its output the higher of the first value and the integrated error;
a capacitor through which passes a current proportional to said third value;
a comparator suitable for comparing a voltage across said capacitor with said third value; and
a switch, driven by said comparator, for short-circuiting said capacitor.

21. A switching regulator according to claim 19, wherein each of said half-bridges comprises a pair of switches.

22. A switching regulator according to claim 19, further comprising an inductance that connects said half-bridges to each other.

23. A switching regulator according to claim 19, wherein:
said first comparator includes a first current mirror that includes a first mirror leg driven by the triangular wave and a second mirror leg connected to the first mirror leg and driven by the integrated error; and
said second comparator includes a second current mirror that includes the first mirror leg and a third mirror leg connected to the first and second mirror legs and driven by the first value.

24. A method, comprising:
driving a switch of a first half bridge of a switching regulator according to a first duty cycle, the first half-bridge connected to an input voltage;
driving a switch of a second half-bridge of the switching regulator according to a second duty cycle, the second half-bridge connected to the first half-bridge and to an output voltage; and
producing an integrated error that reflects an error between a voltage representative of the output voltage and a reference voltage, wherein:
the first duty cycle is proportional to the integrated error divided by the input voltage; and
the second duty cycle is proportional to the input voltage divided by the integrated error;
the method further comprising generating a triangular wave having a variable amplitude equal to a first value, given by the input voltage divided by a proportionality constant, when the integrated error is lower than the first value, and equal to a second value given by the integrated error when the integrated error is higher than the first value, wherein:
driving the switch of the first half-bridge includes applying to the switch of the first half-bridge a first driving signal based on the triangular wave; and
driving the switch of the second half-bridge includes applying to the switch of the second half-bridge a second driving signal based on the triangular wave,
wherein the first driving signal is produced by comparing the integrated error with the triangular wave and the second driving signal is produced by comparing the first value with the triangular wave, and
wherein comparing the integrated error with the triangular wave is performed using a first current mirror that includes a first mirror leg driven by the triangular wave and a second mirror leg connected to the first mirror leg and driven by the integrated error; and comparing the first value with the triangular wave is performed using a second current mirror that includes the first mirror leg and a third mirror leg connected to the first and second mirror legs and driven by the first value.

25. The method of claim 24 wherein:
driving the switch of the first half-bridge includes applying to the switch of the first half-bridge a first driving signal based on the triangular wave; and
driving the switch of the second half-bridge includes applying to the switch of the second half-bridge a second driving signal based on the triangular wave.

26. A switching regulator, comprising:
first and second half-bridges connected to each other and each comprising a switch, the first half-bridge coupled between an input voltage and a reference voltage and the second half-bridge coupled between an output voltage and the reference voltage;
a detector structured to detect an error between a voltage representative of the output voltage and another reference voltage;
an integrator structured to produce an integrated error by integrating the error detected by the detector; and
a controller that controls the first and second half-bridges, the controller including:
a first comparator structured to compare the integrated error with a triangular signal based on the input voltage and output a first driving signal for driving the switch of the first half-bridge according to a first duty cycle proportional to the integrated error divided by the input voltage;
a second comparator structured to compare a first value, proportional to the input voltage, with the triangular signal and output a second driving signal for driving the switch of the second half-bridge according to a second duty cycle proportional to the input voltage divided by the integrated error;
a triangular signal generator structured to generate the triangular signal, which has a variable amplitude equal to the first value, given by the input voltage divided by a proportionality constant, when the integrated error is lower than the first value and equal to a second value given by the integrated error when the integrated error is higher than the first value;
the first comparator includes a first current mirror that includes a first mirror leg driven by the triangular signal and a second mirror leg connected to the first mirror leg and driven by the integrated error; and
the second comparator includes a second current mirror that includes the first mirror leg and a third mirror leg connected to the first and second mirror legs and driven by the first value.

27. The switching regulator of claim 26, wherein the triangular signal generator includes:
a buffer with a differential input stage having an inverting input terminal to which the first value and the integrated error are applied, a non-inverting input terminal to which a third value is applied, and an output, the buffer being suitable for transmitting through its output the higher of the first value and the integrated error;
a capacitor through which passes a current proportional to the third value;
a comparator suitable for comparing a voltage across the capacitor with the third value; and
a switch, driven by the comparator, for short-circuiting the capacitor.

* * * * *

UNITED STATES PATENT AND TRADEMARK OFFICE
CERTIFICATE OF CORRECTION

| | | |
|---|---|---|
| PATENT NO. | : 7,723,966 B2 | Page 1 of 1 |
| APPLICATION NO. | : 11/690680 | |
| DATED | : May 25, 2010 | |
| INVENTOR(S) | : Sandro Rossi | |

It is certified that error appears in the above-identified patent and that said Letters Patent is hereby corrected as shown below:

<u>Column 7</u>

Line 36, issued claim 10, the phrase "claim 9" should read --claim 8--.

Signed and Sealed this

Eighteenth Day of January, 2011

David J. Kappos
*Director of the United States Patent and Trademark Office*